Feb. 23, 1965  R. P. BURR  3,171,051
ELECTRICAL PRINTED-CIRCUIT WINDING
Filed Oct. 31, 1960  5 Sheets-Sheet 1

INVENTOR
ROBERT P. BURR
BY
Charles A. Blank
ATTORNEY

Feb. 23, 1965     R. P. BURR     3,171,051
ELECTRICAL PRINTED-CIRCUIT WINDING
Filed Oct. 31, 1960     5 Sheets-Sheet 2

INVENTOR
ROBERT P. BURR
BY
*Charles A. Blank*
ATTORNEY

Feb. 23, 1965  R. P. BURR  3,171,051
ELECTRICAL PRINTED-CIRCUIT WINDING
Filed Oct. 31, 1960  5 Sheets-Sheet 4

INVENTOR
ROBERT P. BURR
BY Charles A. Blank
ATTORNEY

United States Patent Office 3,171,051
Patented Feb. 23, 1965

3,171,051
ELECTRICAL PRINTED-CIRCUIT WINDING
Robert P. Burr, Lloyd Harbor, Huntington, N.Y., assignor to Printed Motors, Inc., New York, N.Y., a corporation of Delaware
Filed Oct. 31, 1960, Ser. No. 66,113
3 Claims. (Cl. 310—268)

The present invention relates to electrical printed-circuit windings for energy converters. More particularly, the invention relates to electrical windings suitable for use as armatures or field windings in printed-circuit motors or generators.

Printed-circuit motors are described and claimed in copending application Serial No. 691,434, Patent Number 3,090,880, filed October 21, 1957 by F. H. Raymond and J. Henry-Baudot, in application Serial No. 792,733, Patent Number 2,970,238, filed February 12, 1959 by R. L. Swiggett, and in application Serial No. 800,254, filed March 18, 1959 by R. P. Burr, now abandoned in favor of continuing application Serial No. 267,266, filed March 22, 1963. The present invention relates to improvements in windings suitable for use in motors and generators of the types described in the foregoing applications. Such electrical windings preferably are made by printed-circuit techniques and ordinarily comprise printed, plated or etched conductors intimately adhering to an insulating surface.

The efficiency of machines using such windings depends to some extent on minimizing the width of the magnetic air gaps of the machines. Accordingly, it is desirable to eliminate or to minimize as far as possible the use of non-magnetic materials in the air gaps. Usually, non-magnetic printed conductors of the winding are necessary. Previously, thin and consequently highly flexible dielectric sheets have been used as supporting members for the printed conductors. However, it remains highly desirable to reduce the thickness of such dielectric supports.

Also, the use of flexible supporting members for the conductors of the winding in narrow magnetic air gaps has the limitation that during operation physical distortion of the winding may occur and bare conductors may contact other conductive parts of the machine facing them in the air gap. For example, the conductors of the armature may contact the magnetic members bordering the air gap. Further, when windings are applied to normally conductive magnetic surfaces, an intermediate dielectric sheet must be provided between the winding and the magnetic surface, which increases the reluctance of the air gap by creating an additional magnetic air gap at such locations.

In order to improve operating characteristics of printed-circuit machines of the axial air gap type, it has been proposed to place several winding members in layers in a stack and introduce the stack in the air gap. The stacking makes use of intermediate dielectric sheets and consequently is subject to the same limitation as mentioned previously.

Further, under heavy load operating conditions, substantial heat is generated in the armature and convection may be inadequate to cool the armature at extremely low operating speeds.

It is an object of the present invention, therefore, to provide a new and improved electrical printed-circuit winding for an energy converter which avoids one or more of the above-mentioned limitations of prior such windings.

It is another object of the invention to provide a new and improved electrical printed-circuit winding for use in an energy converter having an air gap in which the thickness of nonmagnetic members in the air gap is minimized.

It is another object of the invention to provide a new and improved electrical printed-circuit winding for use as an armature in an energy converter in which the edges of the conductors are well insulated from one another and in which the armature is not susceptible to shorting by accumulation of conductive dust or the like between conductors.

It is another object of the invention to provide a new and improved electrical printed-circuit winding for an energy converter in which the heat radiation properties of the armature are substantially improved.

In accordance with a particular form of the invention, an electrical printed-circuit winding for an energy converter having a narrow magnetic air gap between conductive faces adjacent the winding comprises flat conductors having a major surface portion which is an insulating film integral with the conductors and comprising an insulating compound of the material of the conductors.

For a better understanding of the present invention, together with other and further objects thereof, reference is made to following description, taken in connection with the accompanying drawings, and its scope will be pointed out in the appended claims.

Referring to the drawings.

Figure 2:
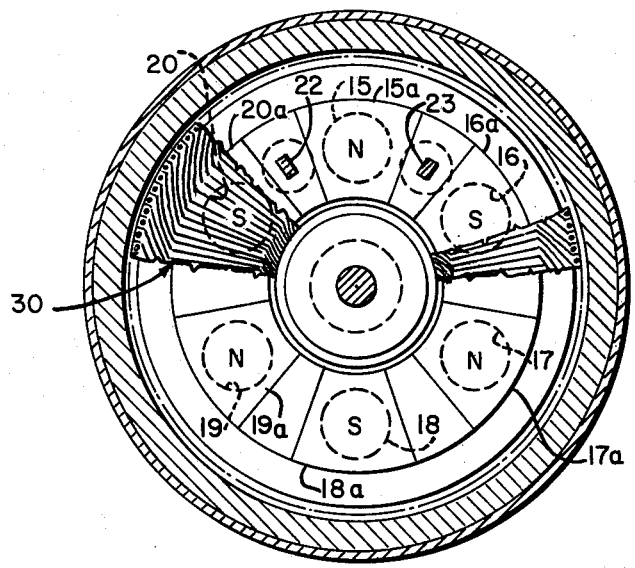
FIG. 2 is a sectional view, taken along lines 2—2 of FIG. 1, with the armature partly broken away.
Figure 1:
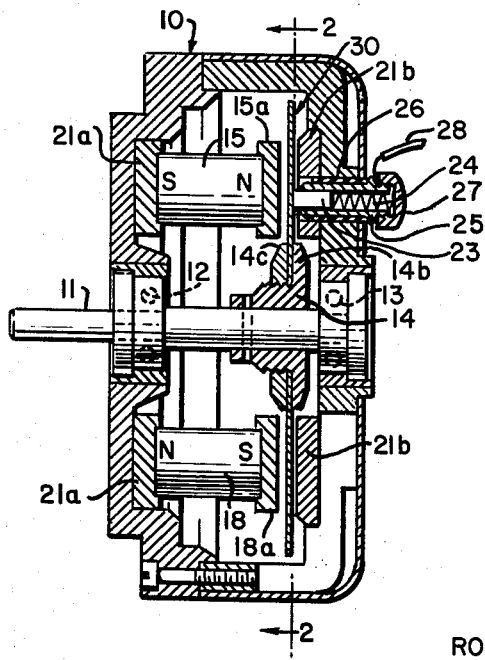
FIG. 1 is a sectional view, taken along a central plane, of a direct-current motor utilizing a printed-circuit armature constructed in accordance with the present invention with one of the brush mounts shown in section.

Referring now more particularly to FIG. 1 of the drawings, the direct-current motor there represented comprises a motor housing 10 supporting a central shaft 11 journaled in suitable bearings 12, 13. An armature 30 constructed in accordance with the invention is mounted on a suitable supporting hub 14 between a flange 14b and threaded nut 14c. As is apparent in FIG. 2, the motor is, for example, a six-pole motor utilizing six permanent magnets, 15 to 20, inclusive, to establish a magnetic field. Suitable electrically and magnetically conductive pole pieces 15a to 20a, inclusive, are attached to the magnets at one end as represented in FIG. 2. An annulus 21a of electrically conductive ferromagnetic material is attached to the other end of the magnets to provide a path for magnetic flux. The magnets are mounted to provide fields of alternate polarity through adjacent regions of the armature as represented by the North-South symbols N-S of FIGS. 1 and 2. A ferromagnetic annulus 21b is positioned on the other side of the armature from the magnets to minimize the air gap in the magnetic field and to complete the path for magnetic flux. Suitable brushes 22, 23, represented in section in FIG. 2, are positioned approximately midway between magnets 20 and 15 and between magnets 15 and 16 to supply current to the motor, as will be described in detail subsequently.

Referring to FIG. 1, brush 23 is maintained in position by a suitable spring 24 mounted in a sleeve 25 within an insulating support 26. A cap of insulating material 27 is threaded on the sleeve 25 for clamping an electrical lead 28 thereto. The brush 22, and a corresponding electrical lead (not shown) are similarly mounted and connected electrically.

Figure 3:
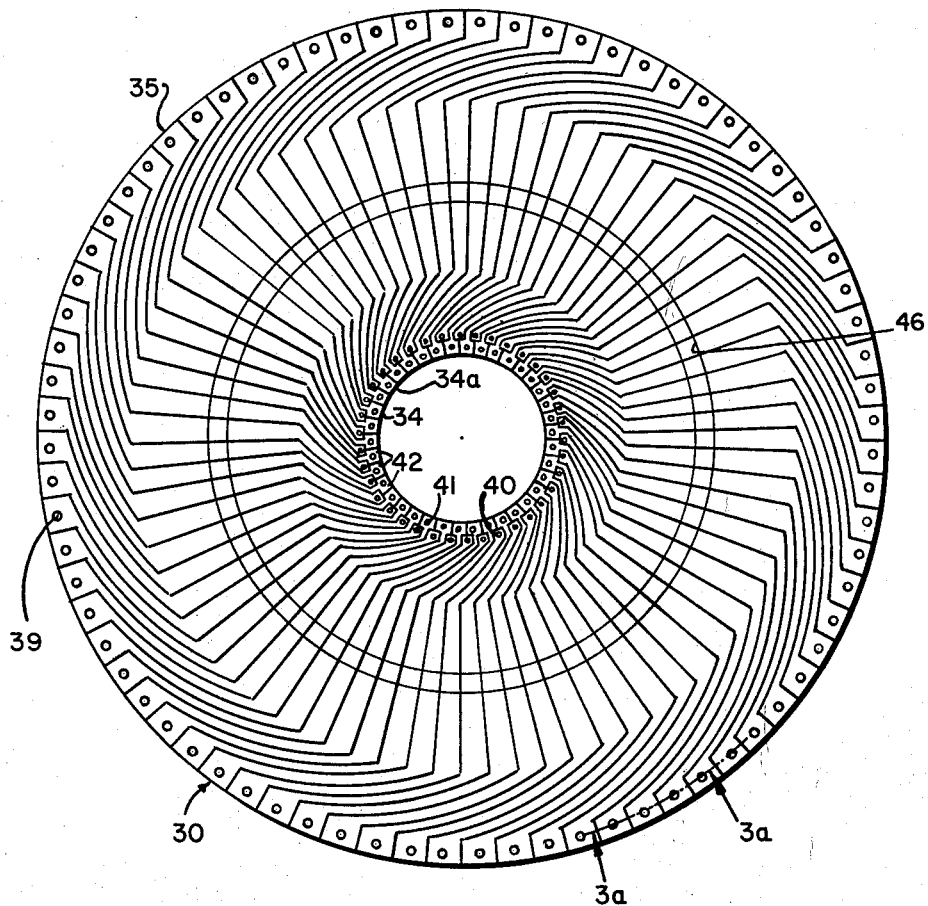
FIG. 3 is a plan view of the armature utilized in the FIG. 1 motor.
Figure 4:
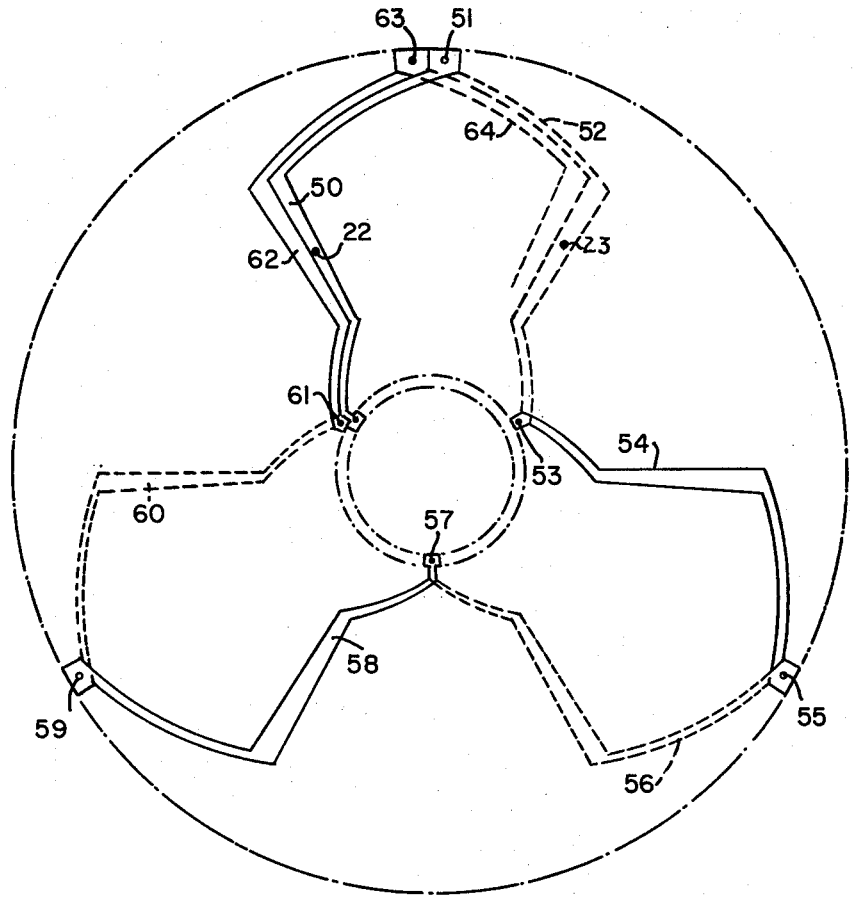
FIG. 4 is a fragmentary plan view of the FIG. 3 armature to represent conductive patterns on both sides of the armature.

Referring now more particularly to FIG. 3 of the drawings, the armature 30 constructed in accordance with the invention is represented in plan view. The armature comprises a winding of flat conductors having a major surface portion which is an insulating film integral with the conductors and comprising an insulating compound of the material of the conductors. The conductive patterns preferably have substantially circular inner and outer boundaries and have interconnections in a plurality of circular rows in the patterns near the boundaries. The conductive pattern represented in FIG. 3 is repeated on the other side of the armature, as represented in FIG. 4, which is a fragmentary view of the armature and its conductive patterns. Thus, the pattern on each side of the armature appears as represented in FIG. 3 when each pattern is viewed from the side of the armature on which that pattern appears. The conductive patterns will be described in detail subsequently.

Figure 3A:
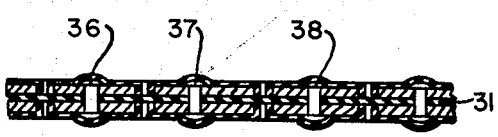
FIG. 3a is an enlarged sectional view of the FIG. 3 armature taken along line 3a—3a of FIG. 3.

The armature has a centrally located aperture 34a for mounting on the hub 14 of FIG. 1. The conductive patterns forming the armature support each other and, therefore, the armature is a self-supporting unit. As represented in FIG. 3a, the armature conductors may be coated on a thin dielectric sheet 31, such as a Mylar sheet, or, alternatively, as represented in FIG. 3b, the dielectric sheet may be omitted.

The conductive patterns have substantially circular inner and outer boundaries 34 and 35, as represented in FIG. 3. Interconnections between the conductive patterns comprise, for example, rivets, 36, 37, and 38 of FIG. 3a through the conductors and disposed in a plurality of substantially circular rows 39, 40 and 41 near the boundaries. The interconnections in the outermost circle 39 are connected to all conductors of the conductive patterns. The interconnections in the innermost circle 41 are connected to alternate conductors in each conductive pattern. The interconnections in the other inner circle 40 are connected to conductors intervening the alternate conductors in the conductive patterns. The alternate conductors connected to the innermost circle 41 are terminated in closely spaced adjacent conductive regions 42, 42 separated by the insulating surfaces of the conductors. The intervening conductors are terminated by conductive regions separated by the alternate conductors.

Thus, it will be seen in FIG. 3 that alternate connections to the conductors are staggered, that is, connections to alternate conductors are in the innermost circle 41 and connections to the intervening conductors are in the adjacent circle 40, preferably midway between the apertures of circle 41.

Figure 3B:
FIG. 3b is an enlarged fragmentary sectional view of a modified armature constructed in accordance with the invention.

FIG. 3b represents an armature, in section, which is similar to the armature of FIGS. 3 and 3a but has soldered or brazed interconnections 45 between conductors, and, as previously mentioned, the dielectric sheet 31 is eliminated in the FIG. 3b armature.

The conductors of the windings FIGS. 3, 3a, and 3b have as their surfaces an insulating film having a thickness of, for example, one micron, which is integral with the conductors and preferably is a black insulating oxide of the material of the conductors, such as copper oxide.

The conductors have conductive exposed surface portion or tracks 46 for contact with the brushes. Each of the plurality of layers of flat conductors in the armature preferably is coated with the insulating film integral with conductors on both outer surfaces of the armature layers and on one or both inner surfaces of the layers so that the layers may be contiguous, as represented in FIG. 3b. Each layer of conductors preferably comprises half-turn conductors evenly distributed over substantially the entire area of the layer with the pair of interconnected layers comprising at least one complete loop of interconnected half-turn conductors. The interconnections between layers are distributed along a pair of registering edges 34, 35 of the layers.

The conductor pattern and the corresponding pattern for current flow through the armature will be partially traced with reference to FIG. 4. Assuming current to enter the motor at brush 22 disposed in contact with conductor 50, current flows along conductor 50 through aperture 51 to conductor 52 on the other side of the armature, through aperture 53 along conductor 54, through aperture 55 along conductor 56 on the other side of the armature, through aperture 57 along conductor 58, through aperture 59 along conductor 60 on the other side of the armature, and through aperture 61 along conductor 62 adjacent conductor 50. Current continues along conductor 62 through aperture 63 along conductor 64 on the other side of the armature adjacent conductor 52. Current flow continues in this manner through every conductor of the armature until it reaches the final conductor (not shown) on the face of the same sheet as conductor 50 and directly under brush 23.

A method of manufacturing the armature will be briefly described. A sheet of copper may be coated on both surfaces by dipping in an Ebonol C bath. Ebonol C is a commercially available solution of activated salts containing caustic alkali; together with strong oxidizing agents, manufactured and sold by Enthone Company, New Haven, Conn., and having the composition set forth in Patent 2,364,993—Meyer. Conductive areas for the rivets may be provided by abrading after the dipping.

The copper sheet is then drilled, perforated or punched to form apertures for the rivets and armature shaft in the pattern represented in FIG. 3. The surfaces of the sheets are then coated with a suitable printing-ink etch resist, known to the art, which resists etching and which is printed on the copper to form the pattern to be etched. Two coated copper sheets are then riveted together. The armature is then immersed in an etching solution to form the conductors represented in FIG. 3. The armature is then dipped again in an Ebonol bath to insulate all exposed conductor edges and rivets. Conductive tracks for the brushes then may be provided by abrading.

If the armature includes a dielectric sheet between conductors, then a single dipping in an Ebonol bath after the conductors have been interconnected is sufficient to coat their outer surfaces and insulate all conductor edges and oxidize any spurious conductive hair lines which may remain between conductors after etching.

Figure 5:
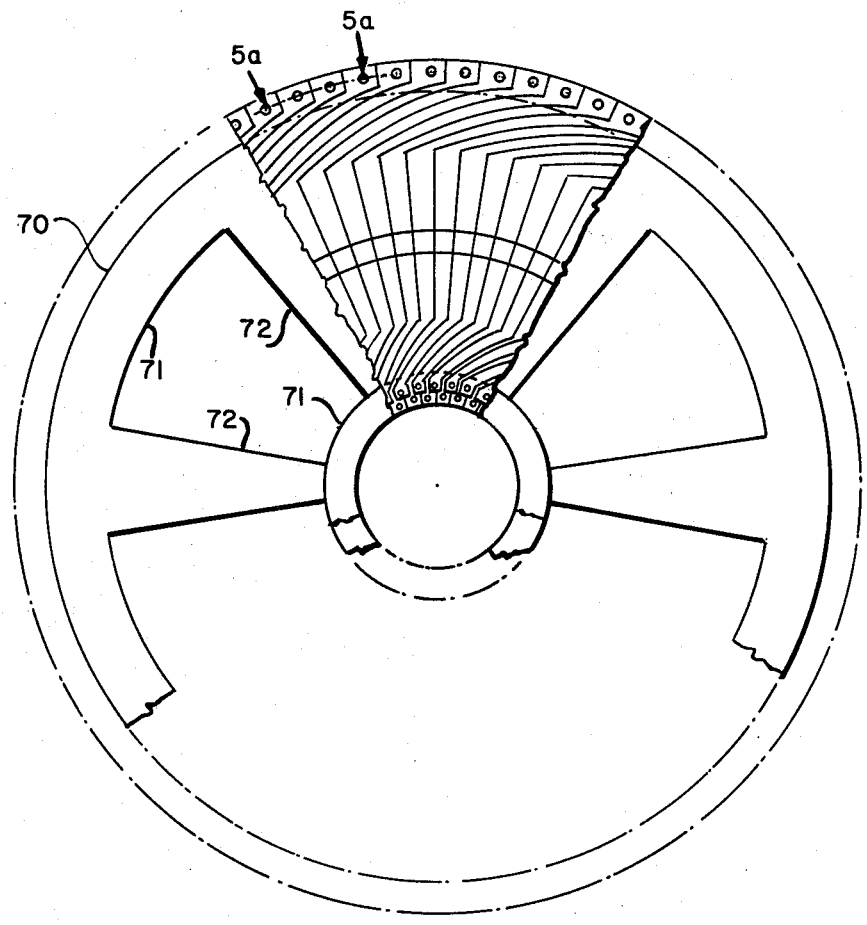
FIG. 5 is a fragmentary plan view of a modified armature constructed in accordance with the invention.
Figure 5A:
FIG. 5a is an enlarged fragmentary sectional view of the FIG. 5 armature taken along lines 5a—5a of FIG. 5.

Referring now more particularly to FIGS. 5 and 5a, there is represented in fragmentary plan and sectional views a modified armature constructed in accordance with the invention. The armature is generally similar to the armature of FIG. 3. The FIG. 5 armature does not utilize a dielectric supporting sheet between layers of conductors but utilizes a metal supporting disk 70, preferably made of a conductive and magnetic material such as stainless steel, cemented to the insulating film on the conductors of the armature. The disk 70 has supporting rims 71 and spokes 72 as represented in the drawing.

Figure 6:
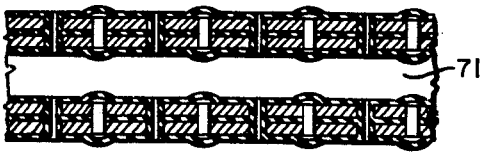
FIG. 6 is an enlarged fragmentary sectional view of a modified armature constructed in accordance with the invention.

As represented in FIG. 6, the metal disk 71 may be cemented between the sheets of conductors which may be connected together by rivets.

Figure 7:
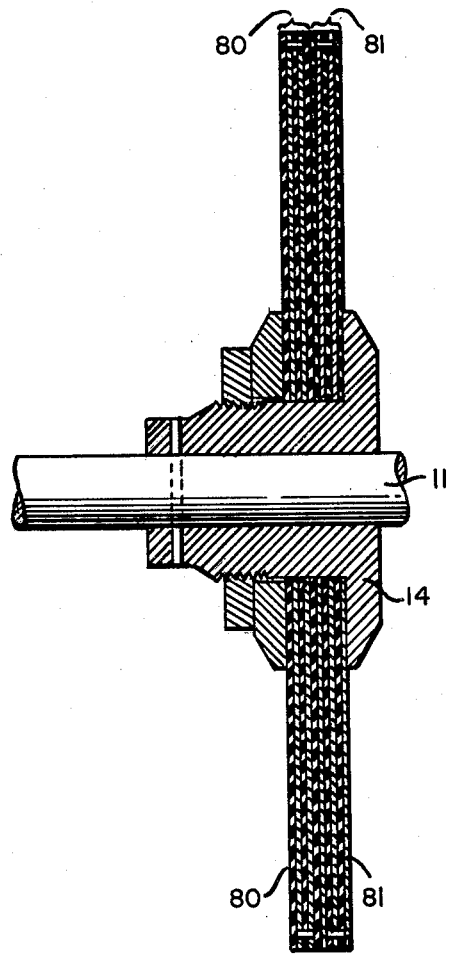
FIG. 7 is an enlarged fragmentary sectional view of a modified armature constructed in accordance with the invention.

Referring now more particularly to FIG. 7 of the drawings, there is represented an armature comprising a plurality of layers of conductors, including at least two sets of interconnected conductor layers with the sets being electrically independent of each other. Thus, the armature of FIG. 7 comprises two electrically independent armature windings 80, 81 mounted on the same shaft which may be utilized to control the rotation of the shaft in a motor generally similar to the type described with reference to FIG. 1 but having an independent set of brushes for each armature winding. Motors of this type are also described and claimed in the copending application Serial No. 21,222 of J. Henry-Baudot filed April 11, 1960, now Patent Number 3,109,114. If desired, the windings may be cemented to a metal disk similar to that represented in FIG. 6 which may have a diameter substantially equal to the diameter of the windings.

From the foregoing description, it will be apparent that windings constructed in accordance with the invention have several advantages. The windings are insulated against spurious contacts with relatively displaceable conductive parts in machines embodying such windings and the conductors can not be short-circuited to each other by conductive dust and the like. Moreover, a substantial reduction of the magnetic air gaps in the machines utilizing such windings is realized by the elimination of dielectric insulators of substantial thickness. The film on the conductors is a minimum thickness, for example, of the order of one micron. The film is made of an insulating compound of the material of the conductors and is sufficiently strong and intimately adhered to the conductive surface that it will not be destroyed by spurious contacts with other components of the machine and by heat conditions in the machine. Moreover, the black oxides of conductive metals substantially improve the heat dissipation from the winding.

Moreover, the treatment of the armature in a bath as previously described, converts to the insulating compound any thin film of conductive material which remains between the conductors after etching. Thus, spurious short circuits between conductors are eliminated during manufacture.

While the windings described have their conductors disposed over substantially the entire surface of the armature, it will be apparent that the invention has application to armature windings which do not cover the entire surface. Moreover, conductively plated apertures can be used for interconnections between conductors in lieu of rivets.

In applications where a damping effect is desired, the damping effect may be introduced by means of a conductive member. The present invention eliminates any necessity of introducing extra dielectric sheets in the assembly of a damped armature of this kind.

While the invention has been described with reference to axial air gap machines, it should be understood that the invention is not limited to such machines but is also applicable to linear and cylindrical windings as disclosed, for example, in copending application Serial No. 800,254 of R. P. Burr, filed March 18, 1959, now abandoned in favor of continuing application Serial No. 267,266, filed March 22, 1963.

The invention is, of course, applicable to current transducers in which two separate windings are utilized in the air gap, one of the windings being, for example, a winding for supplying current and the other being a winding for developing output current.

While there have been described what are presently believed to be the preferred embodimnts of the invention, it will be obvious to those skilled in the art that various changes in modifications may be made therein without departing from the invention, and it is, therefore, aimed to cover all such changes and modifications as fall within the true spirit and scope of the invention.

Having thus described my invention, what I claim and desire to protect by Letters Patent is:

1. An electrical printed-circuit winding for an electromechanical energy converter having a narrow magnetic air gap between conductive faces adjacent the winding and having brushes for translating electrical current flow to the winding, the winding comprising first and second sets of flat conductors having conductive exposed surface portions of said conductors for contact with the brushes and having substantially the entire remaining surface portion made of an insulating film integral with said conductors and consisting of an insulating compound of the material of said conductors, said first and second sets of conductors forming a self-supporting unit and being insulated from each other solely by said insulating film over substantially their entire surface areas.

2. An electrical printed-circuit winding disc for an electromechanical energy converter having a narrow magnetic air gap between conductive faces adjacent the winding and having brushes for translating electrical current flow to the winding, the winding comprising first and second sets of flat copper conductors having annular conductive exposed surface portions of said conductors for contact with the brushes and having substantially the entire remaining surface portion made of a black insulating copper oxide film integral with said conductors, said first and second sets of conductors forming a self-supporting unit and being insulated from each other solely by said insulating film over substantially their entire surface areas.

3. A multipolar annular winding for an electro-mechanical energy converter having a narrow magnetic air gap between conductive faces adjacent the winding and having brushes for translating electrical current flow to the winding, said winding being formed as a disc-like annular band having opposed annular faces, said annular faces each having inner and outer boundaries of substantially different lengths, said winding comprising a first set of conductors arranged in an annular array about a common axis and forming one of said annular faces, a second set of conductors arranged in an annular array about said common axis and forming the other said annular face, said conductors of said first and second sets being thin and of relatively large width in the planes of their respective arrays and substantially completely covering said annular faces of said band with relatively narrow insulating gaps between adjacent conductors, and bridging connections connecting said conductors to form winding loops in at least one series circuit with successive conductors in said series circuit being in different arrays, the successive conductors in the series circuit being spaced apart circumferentially of the annular winding so that the planes of said winding loops are substantially parallel with the plane of the annular winding, said first and second sets of conductors forming a self-supporting unit, said conductors having annular conductive exposed surface portions for contact with the brushes and having substantially the entire remaining surface portions made of an insulating film integral with said conductors and consisting of an insulating compound of the material of said conductors, said first and second sets of conductors being insulated from each other solely by said insulating film over substantially their entire surface areas outside said bridging connections.

References Cited in the file of this patent

UNITED STATES PATENTS

| | | |
|---|---|---|
| 2,441,960 | Eiseler | May 25, 1948 |
| 2,827,536 | Moore et al. | Mar. 18, 1958 |
| 2,955,974 | Allen et al. | Oct. 11, 1960 |
| 2,963,538 | Dahlgren | Dec. 6, 1960 |
| 2,970,238 | Swiggett | Jan. 31, 1961 |